(12) United States Patent
Matsumura et al.

(10) Patent No.: US 6,862,318 B2
(45) Date of Patent: Mar. 1, 2005

(54) IMAGE DATA ENCODING DEVICE

(75) Inventors: Tetsuya Matsumura, Chiyoda-ku (JP); Satoshi Kumaki, Chiyoda-ku (JP); Atsuo Hanami, Chiyoda-ku (JP)

(73) Assignee: Renesas Technology Corp., Tokyo (JP)

(*) Notice: Subject to any disclaimer, the term of this patent is extended or adjusted under 35 U.S.C. 154(b) by 553 days.

(21) Appl. No.: 09/954,160

(22) Filed: Sep. 18, 2001

(65) Prior Publication Data

US 2002/0136299 A1 Sep. 26, 2002

(30) Foreign Application Priority Data

Jan. 24, 2001 (JP) .................................. 2001-015872

(51) Int. Cl.⁷ ............................................... H04B 1/66
(52) U.S. Cl. ......................... 375/240.12; 375/240.16; 375/240.17; 375/240.15; 375/240.14; 382/236; 382/238
(58) Field of Search ................... 375/240.12, 240.16, 375/240.17, 240.15, 240.14, 240.21, 240.24; 382/236, 238, 248, 246; 711/154

(56) References Cited

U.S. PATENT DOCUMENTS 5,822,770 A * 10/1998 Shim .......................... 382/246
5,877,813 A * 3/1999 Lee et al. ................ 375/240.12
6,600,835 B1 * 7/2003 Ishikawa ..................... 382/236

OTHER PUBLICATIONS

Nikkei Electronics, no. 711, pp. 133–148, "MPEG 2 and Encoding LSI Change a Home", Mar. 9, 1998 (with partial English translation).

* cited by examiner

*Primary Examiner*—Shawn S. An
(74) *Attorney, Agent, or Firm*—Oblon, Spivak, McClelland, Maier & Neustadt, P.C.

(57) ABSTRACT

Introduced in an image data encoding device is a logic-memory combined chip in which a memory device and a signal processing device are combined. A logic part and a memory part can be connected to each other with a wide bus, allowing to improve processing capability of data transfer. However, the memory part of the logic-memory combined chip has a small capacity, so that an attempt to increase the capacity will lead to upsizing of the chip, resulting in an increase in costs. Therefore, in a processing that data transfer results in bottlenecks (i.e., motion search), image data is transferred to/from an internal memory capable of transferring data at high speed. In a processing that high-speed data transfer is not required, image data is transferred to/from an external memory.

8 Claims, 21 Drawing Sheets

F I G . 3
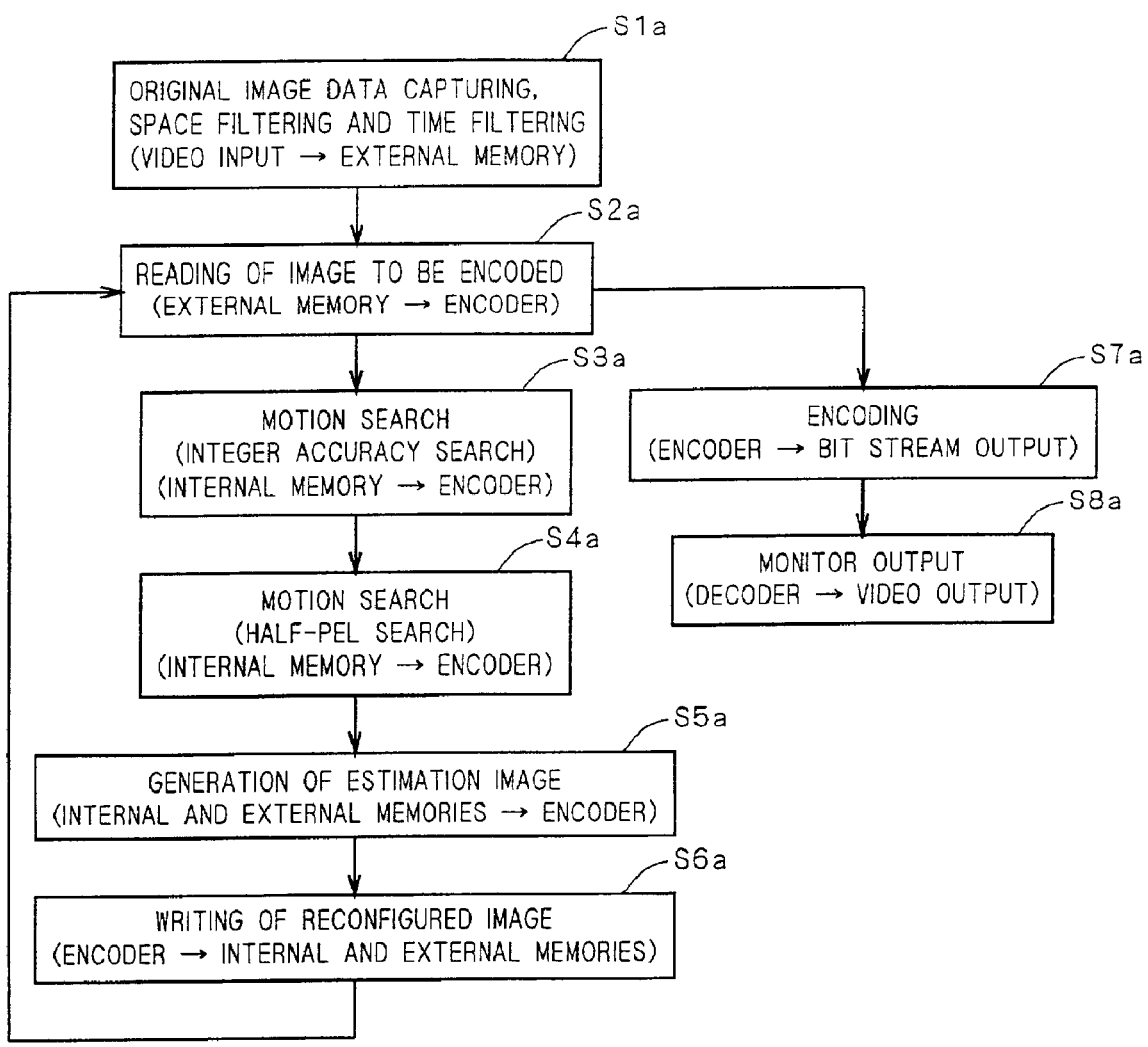

F I G . 4
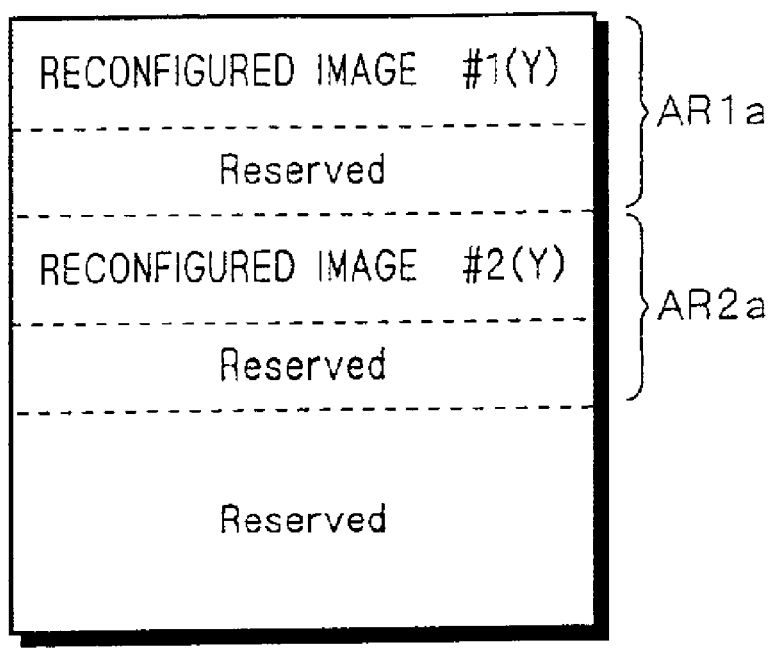

F I G . 8
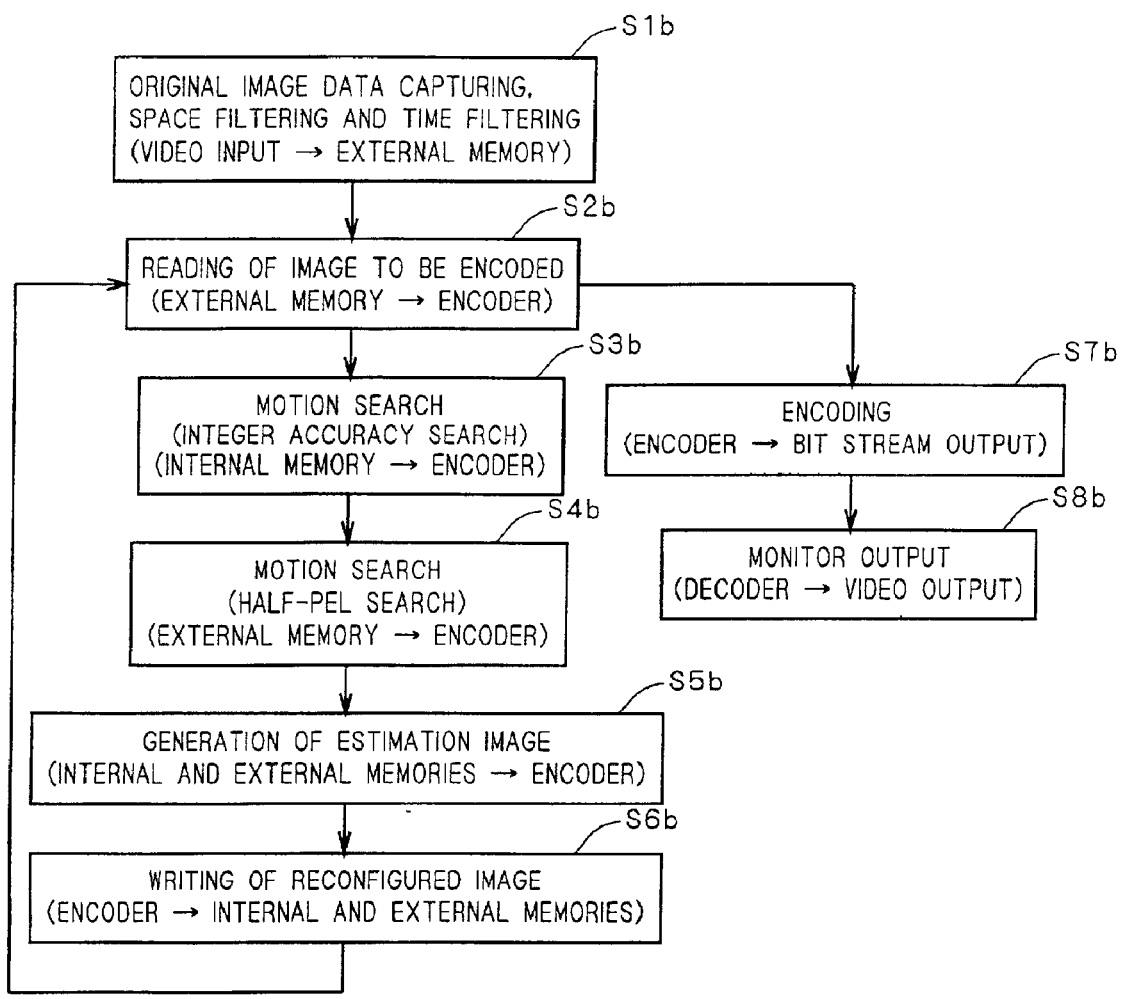

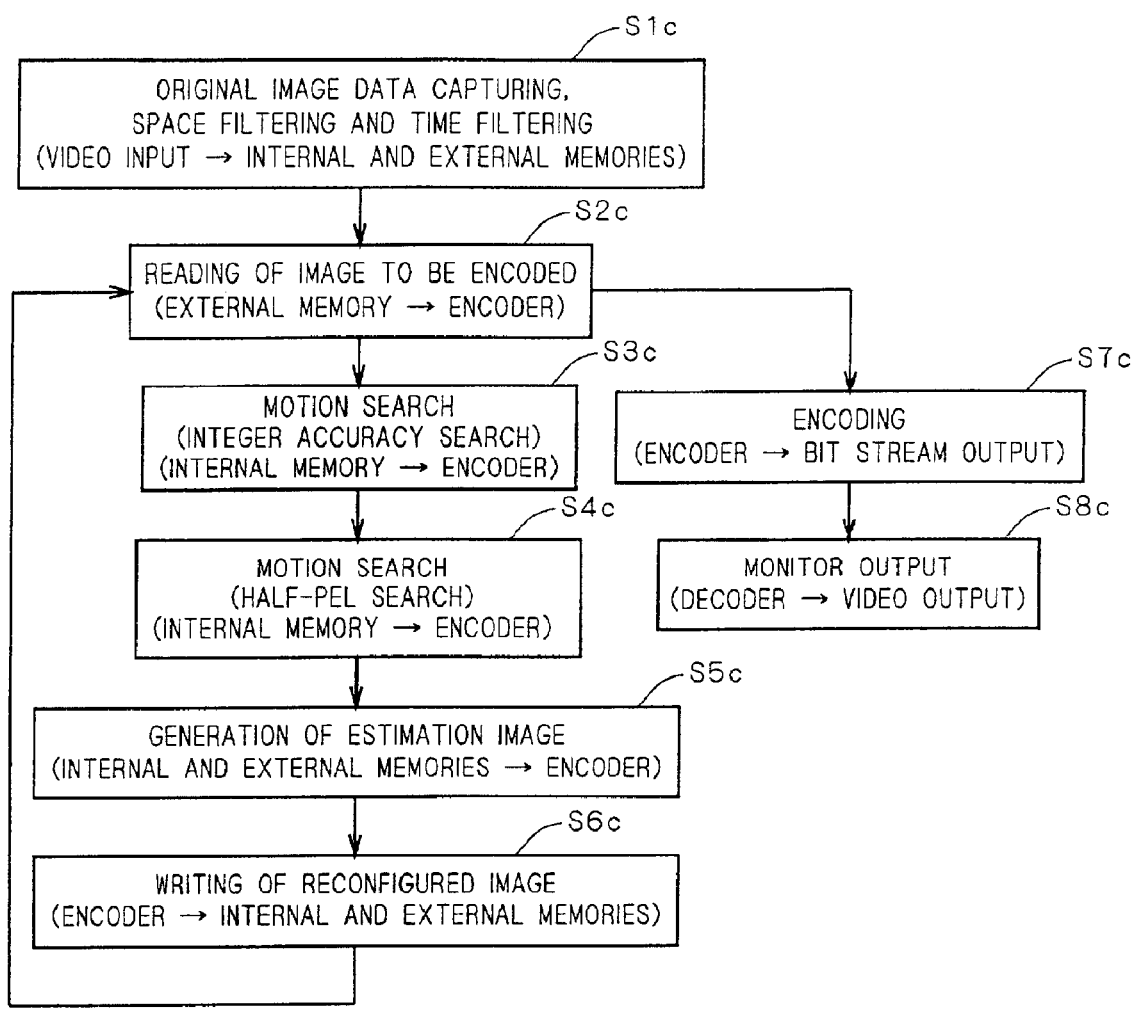

F I G . 1 2
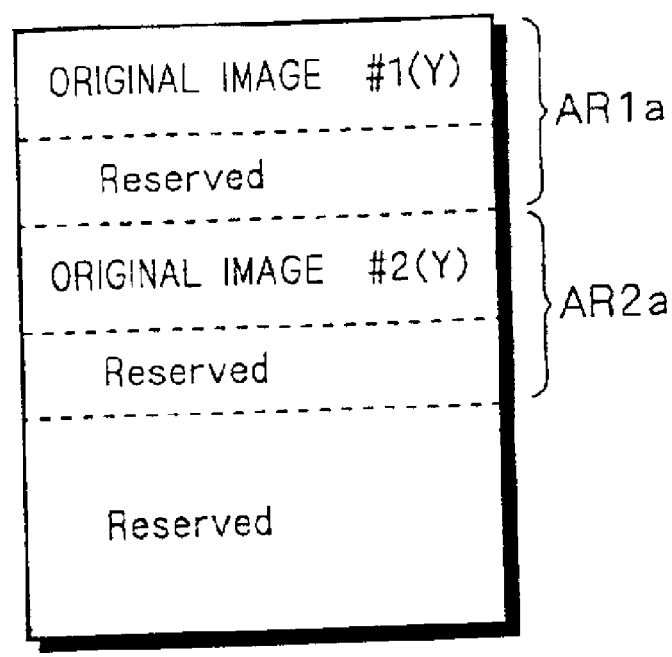

F I G . 1 3
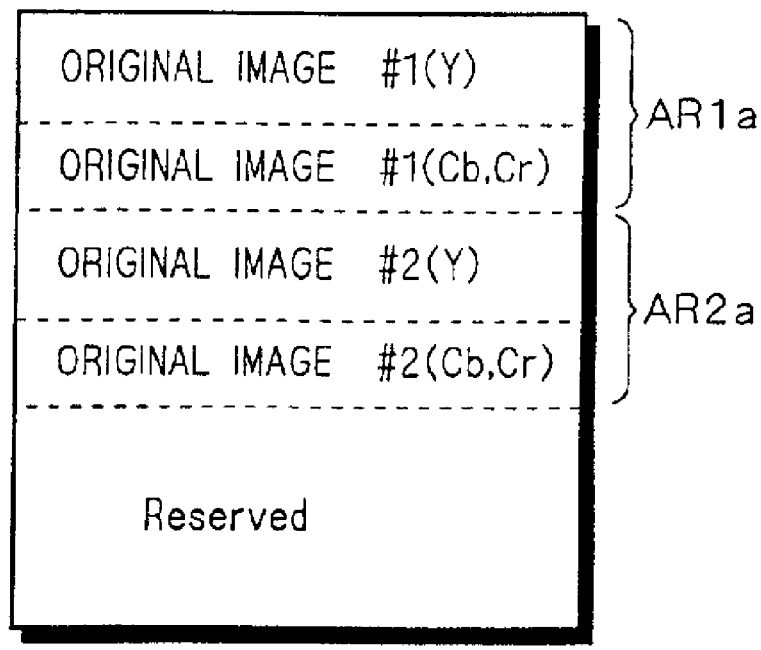

IMAGE DATA ENCODING DEVICE

BACKGROUND OF THE INVENTION

1. Field of the Invention

The present invention relates to an image data encoding device for compressing and encoding image data.

2. Description of the Background Art

In digital audio visual apparatuses such as recordable/reproducible DVDs (Digital Versatile Discs), D-VHSs (Digital-Video Home Systems), digital broadcast transmitters and receivers and the like, the International Standard MPEG2 (Moving Picture Experts Group 2: ISO-IEC/JTC1 SC29 DIS13818, Part 2, 1994) is employed as a method of compressing image data. In an encoding process of image data based on the MPEG2 standard, there are an enormous amount of operation required for image data compression and an enormous amount of data transfer between a signal processing device and a memory device.

FIG. 20 shows a structure of a conventional image data encoding device 200. As shown in FIG. 20, the image data encoding device 200 comprises an MPEG2 processing unit 102 compressing and encoding image data and a memory interface 103 controlling data transfer. The MPEG2 processing unit 102 and the memory interface 103 are connected to each other through a bus 101. An external memory 107 provided outside such as a general purpose DRAM (Dynamic Random Access Memory) is connected to the memory interface 103 through a bus 106.

The MPEG2 processing unit 102 includes an encoder, a decoder and a motion estimation device, and an original image before data compression is inputted into the encoder as a video input 108. Image data encoded in the encoder is outputted as a bit stream output 109. The decoder decodes the encoded image data and outputs it as a video output 110 so that it can be monitored if the image data has been encoded appropriately.

FIG. 21 is a flow chart showing data transfer in an encoding process at each frame of the image data encoding device 200. First, original image data is inputted into the MPEG2 processing unit 102 as the video input 108, where the data undergoes space filtering and time filtering as preceding processes. Here, the space filtering indicates a process of filtering an image signal in the same frame to remove high-frequency noise, and the time filtering indicates a process of comparing pixels between a frame and the subsequent one to remove high-frequency noise.

The original image data having already undergone the space filtering is stored in the external memory 107 through the bus 101, the memory interface 103 and the bus 106 by each frame. In the time filtering, the MPEG2 processing unit 102 reads out image data from the external memory 107 and compares pixels between a frame and the subsequent one, thereby removing high-frequency noise.

The original image data having already undergone the preceding processes is stored in the external memory 107 through the bus 101, the memory interface 103 and the bus 106 by each frame (step S1f).

After image data is stored for several frames, the data in the frames being images to be encoded is reordered in the sequence for subsequent motion search, and thereafter, is read out into the encoder in the MPEG2 processing unit 102 (step S2f).

First, the encoder encodes an I (Intra) frame, and encoded information is outputted as the bit stream output 109 (step S7f). The encoding process includes discrete cosine transformation, quantization, variable length encoding and the like. In the case of an I frame, intra-frame encoding is performed, so that motion search is not carried out.

In the decoder in the MPEG2 processing unit 102, the video output 110 is generated for monitoring the encoded data (step S8f). Further, decoded image data is data of an image reconfigured by a series of encoding processes (reconfigured image) and is also stored in the external memory 107 through the bus 101, the memory interface 103 and the bus 106 so as to be used as a reference image for estimating a frame and the subsequent one.

Next, an encoding process of a P (Predictive) frame will be described. First, reordered image data is read out into the encoder (step S2f). In the case of a P frame, motion search (including associated reverse quantization and reverse discrete cosine transformation) is performed in the motion estimation device based on a reconfigured image of I or P frame. The encoder configures a new image (estimation image) based on a motion vector obtained by the motion search, and thereafter, carries out encoding.

As an example of the motion search, FIG. 21 shows a case where search is performed with integer pixel accuracy to roughly estimate the motion, and thereafter, search is performed with half-pel (half pixel) accuracy to determine the motion vector with high accuracy (steps S3f, S4f). In either motion search, a reference image for the motion search is of I or P frame. Therefore, when generating a first P frame, for example, the reconfigured image previously reconfigured is read out from the external memory 107.

At this time, the memory interface 103 reads out image data of the reconfigured image from the external memory 107 as a reference image (search window data), and sends the image data to the MPEG2 processing unit 102. The original image data of the P frame read out from the external memory 107 in step S2f is used in the motion estimation device as a template image to be the origin of generation of an estimation image.

The MPEG2 processing unit 102 performs motion search using the template image and the search window data, thereby obtaining the motion vector.

Subsequently, the MPEG2 processing unit 102 generates an estimation image based on the obtained motion vector (step S5f). As the generation is based on I or P frame, the reconfigured image of the I frame is read out again from the external memory 107 when generating a first P frame, for example.

The generated estimation image is written into the external memory 107 as a reconfigured image (step S6f), and thereafter, the encoder performs encoding. That is, the encoder reads out the reconfigured image from the external memory 107 (step S2f) for encoding, and outputs encoded information as the bit stream output 109 (step S7f).

As in the case of an I frame, the decoder generates the video output 110 for monitoring the encoded data (step S8f). The reconfigured image in the external memory 107 is also used as a reference image for estimating the next frame.

In the next and later generation of P frames, data of the reconfigured image of a P frame is read out instead of that of an I frame.

Next, an encoding process of a B (Bidirectionally predictive) frame will be described. Motion search is carried out in a B frame as in a P frame to configure a new image based on a motion vector obtained by the motion search, and thereafter, encoding is performed. Thus, the flow of the chart shown in FIG. 21 is the same as that of a P frame.

In the case of a B frame, however, the motion search is performed based not only on past image data but also on future image data, resulting in an increase in the amount of the motion search in steps S3f and S4f (the motion search is carried out based on future image data alone for a B frame in an early stage of encoding where past image data does not exist).

As has been described, in the encoding process of image data based on the MPEG2 standard, there are enormous amounts of operations for image data compression and enormous amounts of data transfer between a signal processing device (image data encoding device 200 in FIG. 20) and a memory device (external memory 107 in FIG. 20).

In processing these enormous amounts of data, there arises a problem of how to construct the image data encoding device. In other words, a subject in system construction of the encoding device has been how to solve degradation in performance (degradation in display image quality) due to lack of processing capability and data transfer capability.

In the structure of the image data encoding device shown in FIG. 20, employment of the memory device such as a general purpose DRAM results in that the processing capability in data transfer is limited by the operational speed of input/output pins and the bus width between the memory interface 103 and the external memory 107.

For instance, MPEG2 encoding of image data at a resolution of the digital television standard SDTV (Standard Definition TV) having the same image quality as the current broadcast requires a memory having a capacity of 32 megabits or more. Further, MPEG2 encoding of image data at a resolution of HDTV (High Definition TV) having higher image quality requires a memory having a capacity of 256 megabits or more.

In order to transfer image data stored in such a large-capacity memory rapidly and effectively, it is desirable to speed up operation at input/output pins and to increase the bus width. However, when a memory device such as a general purpose DRAM is employed, such a desire is not realized immediately.

SUMMARY OF THE INVENTION

According to a first aspect of the present invention, an image data encoding device comprises: an internal memory; a memory interface that can be connected to an external memory, the memory interface being connected to the internal memory for controlling reading/writing of data with respect to the external memory and the internal memory; and an image data encoding unit in which a sequence of plural pieces of image data are inputted, performing motion search for the image data to generate an estimation image and encoding the image data using the estimation image. In the image data encoding device, the image data used as a reference image in the motion search is written into the internal memory through the memory interface.

According to a second aspect of the present invention, in the image data encoding device of the first aspect, the image data used as the reference image in the motion search is also written into the external memory through the memory interface.

According to a third aspect of the present invention, in the image data encoding device of the first or second aspect, the image data used as the reference image in the motion search is image data of a reconfigured image which is an estimation image previously generated and includes image data of a luminance signal of the reconfigured image.

According to a fourth aspect of the present invention, in the image data encoding device of the third aspect, the image data used as the reference image in the motion search further includes image data of a color-difference signal of the reconfigured image.

According to a fifth aspect of the present invention, in the image data encoding device of the first or second aspect, the image data used as the reference image in the motion search is image data of a reconfigured image which is an estimation image previously generated and includes sub-sampled image data of the reconfigured image.

According to a sixth aspect of the present invention, in the image data encoding device of the fifth aspect, full-sampled image data is written into the external memory, the motion search includes motion search with integer pixel accuracy and motion search with half-pel accuracy, the sub-sampled image data is used as a reference image in the motion search with integer pixel accuracy, and the full-sampled image data is used as a reference image in the motion search with half-pel accuracy.

According to a seventh aspect of the present invention, in the image data encoding device of the first or second aspect, the image data used as the reference image in the motion search is data of an original image of the inputted image data and includes image data of a luminance signal of the original image.

According to an eighth aspect of the present invention, in the image data encoding device of the seventh aspect, the image data used as the reference image in the motion search further includes image data of a color-difference signal of the original images.

According to a ninth aspect of the present invention, in the image data encoding device of the first or second aspect, the image data used as the reference image in the motion search is data of an original image of the image data inputted and includes sub-sampled image data of the original image.

According to a tenth aspect of the present invention, in the image data encoding device of the ninth aspect, full-sampled image data is written into the external memory, the motion search includes motion search with integer pixel accuracy and motion search with half-pel accuracy, the sub-sampled image data is used as a reference image in the motion search with integer pixel accuracy, and the full-sampled image data is used as a reference image in the motion search with half-pel accuracy.

According to an eleventh aspect of the present invention, in the image data encoding device of the first aspect, the plural pieces of image data inputted are written into the internal memory through the memory interface as an original image.

In the image data encoding device of the first aspect, the image data used as the reference image in the motion search is written into the internal memory through the memory interface. Thus, setting the bus wide between the internal memory and the memory interface allows to achieve the image data encoding device having processing capability of data transfer little limited by the use of the external memory and being capable of controlling the capacity of the internal memory for preventing an increase in costs. This enables to achieve the image data encoding device capable of transferring image data effectively and rapidly in motion search in which large amounts of data are transferred.

In the image data encoding device of the second aspect, the image data used as the reference image in the motion search is also written into the external memory through the memory interface. Thus, when it is insufficient merely to use the image data written in the internal memory at generation of an estimation image and an encoding process, the image data written in the external memory can be used as assistance.

In the image data encoding device of the third aspect, the image data used as the reference image in the motion search includes the image data of the luminance signal which is visually easy of perception, which allows the motion search to be performed with high accuracy.

In the image data encoding device of the fourth aspect, the image data used as the reference image in the motion search further includes the image data of the color-difference signal, which allows the motion search to be performed with still higher accuracy.

In the image data encoding device of the fifth aspect, the image data used as the reference image in the motion search includes the sub-sampled image data, allowing a reduction in capacity of the internal memory compared to the case of performing the motion search for the full-sampled image data and a reduction in processing time required for operation.

In the image data encoding device of the sixth aspect, the sub-sampled image data is used as the reference image in the motion search with integer pixel accuracy, and the full-sampled image data is used as the reference image in the motion search with half-pel accuracy. Therefore, an idea of a motion vector can be gained for a short operating time in the motion search with integer pixel accuracy, and the motion vector can be obtained accurately in the motion search with half-pel accuracy.

In the image data encoding device of the seventh aspect, the image data used as the reference image in the motion search includes the image data of the luminance signal which is visually easy of perception, so that the motion search can be performed with high accuracy.

In the image data encoding device of the eighth aspect, the image data used as the reference image in the motion search further includes the image data of the color-difference signal, so that the motion search can be performed with still higher accuracy.

In the image data encoding device of the ninth aspect, the image data used as the reference image in the motion search includes the sub-sampled image data, which allows a reduction in capacity of the internal memory compared to the case of performing the motion search for the full-sampled image data and a reduction in processing time required for operation.

In the image data encoding device of the tenth aspect, the sub-sampled image data is used as the reference image in the motion search with integer pixel accuracy, and the full-sampled image data is used as the reference image in the motion search with half-pel accuracy. Therefore, an idea of a motion vector can be gained for a short operating time in the motion search with integer pixel accuracy, and the motion vector can be obtained accurately in the motion search with half-pel accuracy.

In the image data encoding device of the eleventh aspect, the plural pieces of image data inputted are written into the internal memory through the memory interface as the original image, which allows to employ an external memory that is not very excellent in specs for the operational speed and the bus width, different from the case of writing inputted image data into the external memory.

An object of the present invention is to provide an image data encoding device capable of transferring image data effectively and rapidly.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart showing data transfer in an encoding process at each frame of the image encoding device of the first embodiment;

FIG. 4 shows an exemplary memory map of an internal memory 104 in the image encoding device of the first embodiment;

FIG. 8 is a flow chart showing data transfer in an encoding process at each frame of the image encoding device of a third preferred embodiment of the invention;

FIG. 11 is a flow chart showing data transfer in an encoding process at each frame of the image encoding device of a fifth preferred embodiment of the invention;

FIG. 12 shows an exemplary memory map of the internal memory 104 in the image encoding device of the fifth embodiment;

FIG. 13 shows an exemplary memory map of the internal memory 104 in the image encoding device of a sixth preferred embodiment of the invention;

FIG. 20 shows a conventional image data encoding device; and

DESCRIPTION OF THE PREFERRED EMBODIMENTS

<First Preferred Embodiment>

In the present embodiment, a logic-memory combined chip in which a memory device and a signal processing device (logic device) are combined is introduced into an image data encoding device, to thereby achieve the image data encoding device having processing capability of data transfer little limited by the use of an external memory and being capable of transferring image data effectively and rapidly.

In the case of the logic-memory combined chip, a logic part and a memory part can be connected to each other with a wide bus, allowing to improve processing capability of data transfer. However, the memory part of the logic-memory combined chip has a smaller capacity than that of a general purpose DRAM, so that an attempt to increase the capacity will lead to upsizing of the chip, resulting in an increase in costs.

Accordingly, the present invention employs a memory division method in which a memory required for encoding and motion search is divided into an external memory connected to the outside and an internal memory provided on the logic-memory combined chip, and either the external memory or the internal memory is used as required.

More specifically, in a processing that data transfer results in bottlenecks, image data is transferred to/from the internal memory capable of transferring data at high speed. In a processing that high-speed data transfer is not required, image data is transferred to/from the external memory.

Figure 1:
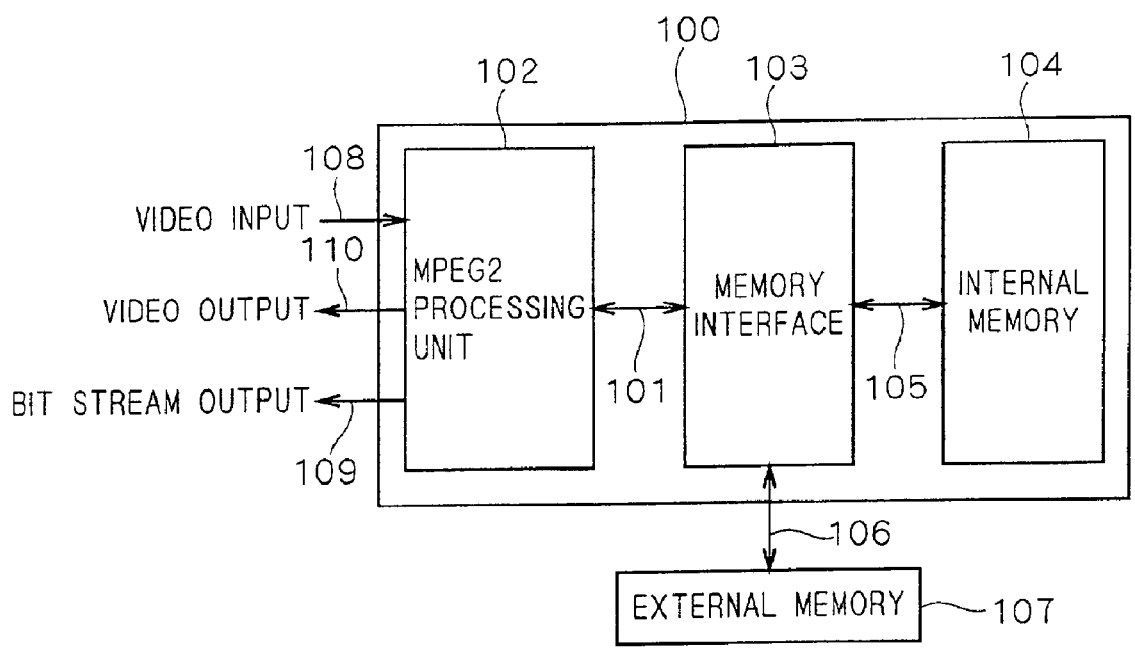
FIG. 1 shows an image encoding device according to a first preferred embodiment of the invention.

FIG. 1 shows a structure of an image data encoding device 100 according to the present embodiment. As shown in FIG. 1, the image data encoding device 100 comprises the MPEG2 processing unit 102 compressing and encoding inputted image data, the memory interface 103 controlling data transfer and an internal memory 104 such as an integral DRAM. The MPEG2 processing unit 102 and the memory interface 103 are connected to each other through the bus 101. The internal memory 104 is connected to the memory interface 103 through a bus 105. The external memory 107 provided outside such as a general purpose DRAM is connected to the memory interface 103 through the bus 106.

The bus 105 connected to the internal memory 104 is assumed to have a width of 128 bits, 256 bits, 512 bits, 1024 bits, etc., for example. The bus 106 connected to the external memory 107 is substantially assumed to have a width of 16 bits, 32 bits, 64 bits, etc., for example, because of limitations in the number of I/O pins of the external memory 107.

Figure 2:
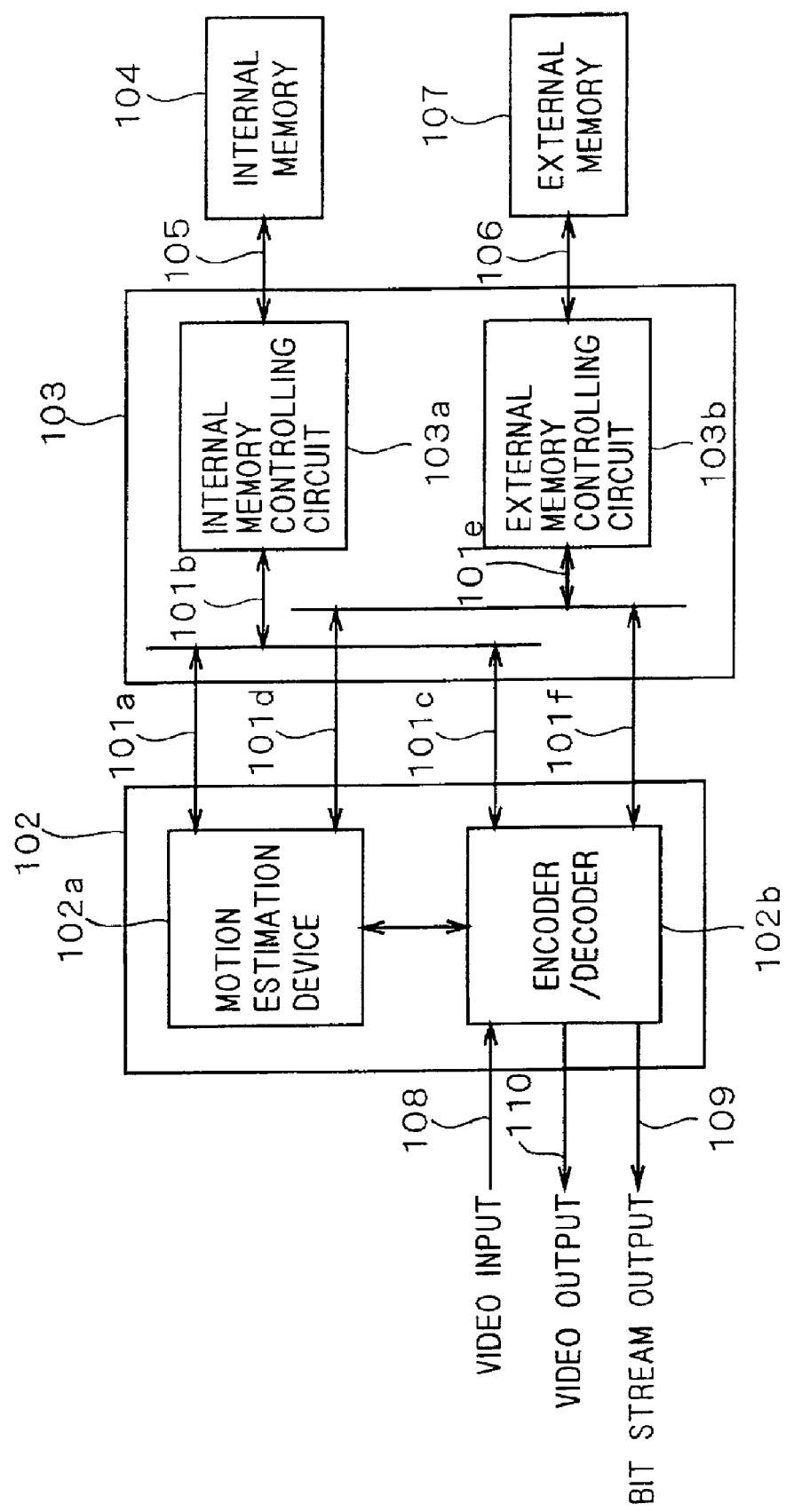
FIG. 2 is a detailed view showing a structure of an MPEG2 processing unit 102 and a memory interface 103 in the image encoding device of the first embodiment.

FIG. 2 is a detailed view showing the structure of the MPEG2 processing unit 102 and the memory interface 103. The MPEG2 processing unit 102 includes a motion estimation device 102a and an encoder/decoder 102b. An original image before data compression is inputted into the encoder 102b as the video input 108. The original image is a video signal converted to digital form, which is in compliance with ITU-R-656 form, for example.

Image data encoded in the encoder is outputted as the bit stream output 109. The decoder decodes the encoded image data and outputs it as the video output 110 so that it can be monitored if the image data has been encoded appropriately.

The memory interface 103 includes an internal memory controlling circuit 103a for controlling data transfer to/from the internal memory 104 and an external memory controlling circuit 103b for controlling data transfer to/from the external memory 107. The internal memory controlling circuit 103a is connected to the motion estimation device 102a and the encoder/decoder 102b in the MPEG2 processing unit 102 through buses 101a to 101c. The external memory controlling circuit 103b is also connected to the motion estimation device 102a and the encoder/decoder 102b in the MPEG2 processing unit 102 through buses 101d to 101f.

FIG. 3 is a flow chart showing data transfer in an encoding process at each frame in the image data encoding device 100. First, original image data is inputted into the MPEG2 processing unit 102 as the video input 108, where the data undergoes the space filtering and time filtering as the preceding processes in the encoder.

The original image data having already undergone the space filtering is stored in the external memory 107 through the bus 101, the memory interface 103 and the bus 106 by each frame. In the time filtering, the MPEG2 processing unit 102 reads out image data from the external memory 107 and compares pixels between a frame and the subsequent one, thereby removing high-frequency noise.

The original image data having already undergone the preceding processes is stored in the external memory 107 through the bus 101, the memory interface 103 and the bus 106 by each frame (step S1a).

After image data is stored for several frames, the data in the frames being images to be encoded is reordered in the sequence for subsequent motion search, and thereafter, is read out into the encoder in the MPEG2 processing unit 102 (step S2a).

The encoder performs an encoding process of an I frame, and encoded information is outputted as the bit stream output 109 (step S7a). The encoding process includes discrete cosine transformation, quantization, variable length encoding and the like. In the case of an I frame, intra-frame encoding is performed, so that motion search is not carried out.

In the decoder in the MPEG2 processing unit 102, the video output 110 is generated for monitoring the encoded data (step S8a). Further, decoded image data is stored in the external memory 107 as a reconfigured image and is used as a reference image for estimating a frame and the subsequent one.

In the present embodiment, a reconfigured image written in the internal memory is used as a reference image for motion search, and image data of a luminance (Y) signal in image data of an I frame is written into the internal memory 104. The reason for writing the image data of the luminance signal is that the luminance signal is more visually perceptible than a color-difference (Cb, Cr) signal, and the use of the luminance signal allows motion search to be performed with high accuracy.

Further, writing image data into the internal memory 104 is for achieving high-speed data transfer by transferring image data to/from the internal memory, since there are large amounts of data transfer particularly in the motion search in the MPEG2 encoding process.

The encoding process requires not only image data of the luminance signal but also that of the color-difference signal in a reconfigured image of an I frame, so that the image data of the both signals is also stored in the external memory 107.

Figure 5:
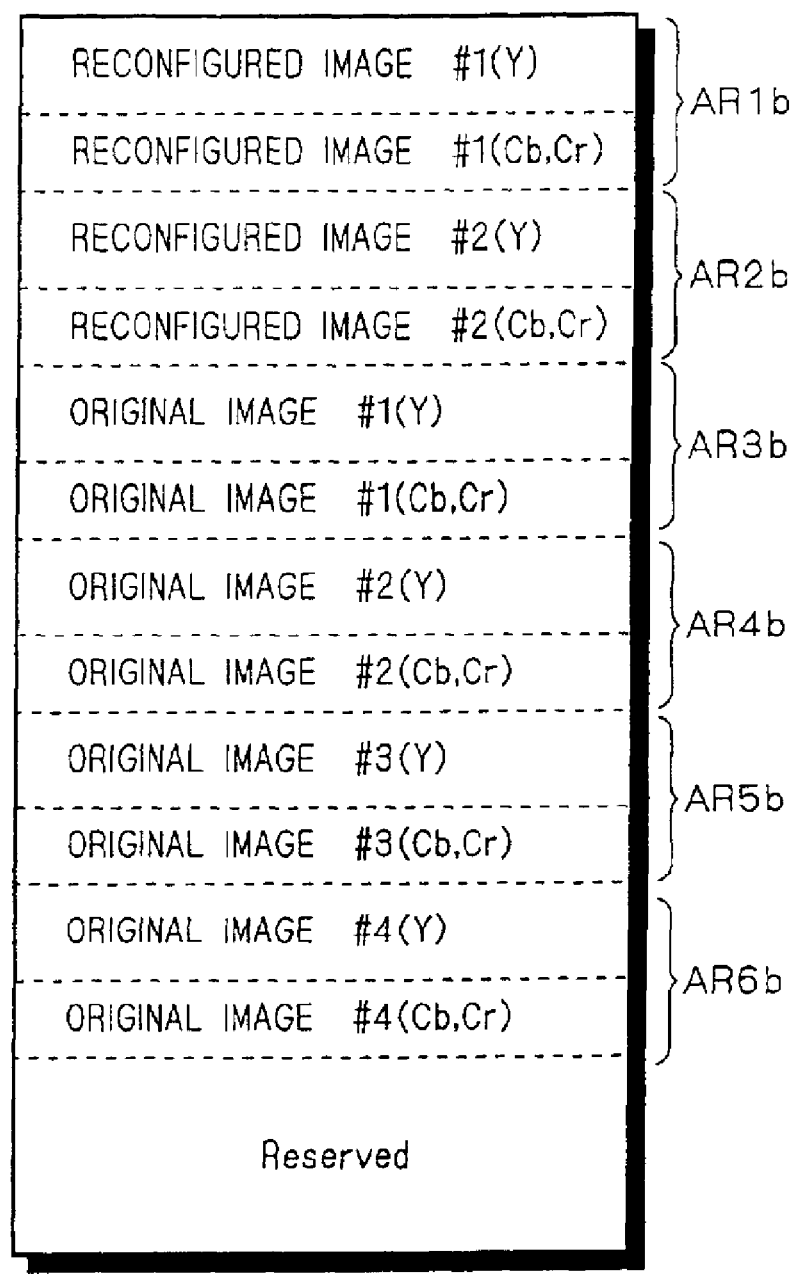
FIG. 5 shows an exemplary memory map of an external memory 107 in the image encoding device of the first embodiment.

FIGS. 4 and 5 show exemplary memory maps of the image data of the luminance (Y) signal and the color-difference (Cb, Cr) signal. FIG. 4 is an exemplary memory map of the internal memory 104, and FIG. 5 is an exemplary memory map of the external memory 107.

As shown in FIG. 4, stored in a storage area AR1a is only image data #1 (Y) of the luminance signal of the reconfigured image of a frame, and there is indicated "Reserved" for the image data of the color-difference signal. Similarly, stored in a storage area AR2a is only image data #2 (Y) of the luminance signal in the reconfigured image of another frame, and there is indicated "Reserved" for the image data of the color-difference signal.

On the other hand, as shown in FIG. 5, stored in a storage area AR1b is image data #1 (Y) of the luminance signal and image data #1 (Cb, Cr) of the color-difference signal of the reconfigured image of a frame. Similarly, stored in a storage area AR2b is image data #2 (Y) of the luminance signal and image data #2 (Cb, Cr) on the color-difference signal of the reconfigured image of another frame.

Areas other than the storage areas AR1a and AR2a of the internal memory 104 are indicated as "Reserved", and data #1 (Y), #1(Cb, Cr) to #4(Y), #4(Cb, Cr) of the inputted original image is stored in storage areas AR3b to AR6b of the external memory 107, respectively. Areas other than the storage areas AR1b to AR6b are indicated as "Reserved".

Next, an encoding process of a P frame will be described. First, reordered image data is read out into the encoder (step S2a). In the case of a P frame, motion search (including associated reverse quantization and reverse discrete cosine transformation) is performed at the motion estimation device 102a based on a reconfigured image of I or P frame. The encoder configures a new image (estimation image) based on a motion vector obtained by the motion search, and thereafter, carries out encoding.

As an example of the motion search, FIG. 3 shows a case where search is performed with integer pixel accuracy to roughly estimate motion, and then, search is performed with half-pel (half pixel) accuracy to determine the motion vector with high accuracy (steps S3a, S4a). A reference image used in either motion search is of I or P frame. Therefore, when generating a first P frame, for example, image data of the luminance signal of the reconfigured image of the I frame previously reconfigured is read out from the internal memory 104.

At this time, the memory interface 103 reads out image data of the luminance signal from the internal memory 104 as a reference image (search window data) used in motion search, and sends the image data to the motion estimation device 102a. Original image data of a P frame read out from the external memory 107 in step S2a is used in the motion estimation device 102a as a template image.

Appropriate control of the internal memory controlling circuit 103a and the external memory controlling circuit 103b in the memory interface 103 allows data transfer from the both memories in steps S2a to S4a to be performed almost simultaneously. At this time, if the bus between the internal memory 104 and the memory interface 103 is set wide, the search window data can be transferred within an allowable cycle. This allows image data transfer to be performed effectively and rapidly in motion search in which large amounts of data are transferred.

Then, the motion estimation device 102a performs motion search using the template image and the search window data, thereby obtaining the motion vector.

Subsequently, the motion estimation device 102a generates an estimation image based on the obtained motion vector (step S5a). As the generation is based on I or P frame, the reconfigured image of the I frame is read out again from the memory when generating a first P frame, for example.

Since the image data of the luminance signal has already been stored in the internal memory 104 by the above reading, the image data of the luminance signal is read out from the internal memory 104 and that of the color-difference signal is read out from the external memory 107.

In this way, the image data of the luminance signal used as a reference image in the motion search has also been written into the external memory 107. Thus, when it is insufficient merely to use image data in the internal memory 104 at generation of an estimation image and an encoding process, image data written in the external memory 107 can be used as assistance.

The generated estimation image is written into the internal memory 104 and the external memory 107 as a reconfigured image (step S6a), and thereafter, the encoder performs encoding. That is, a reconfigured image written in the internal memory 104 and the external memory 107 is used for the next motion search. The encoder reads out the reconfigured image from the external memory 107 (step S2a) for encoding, and outputs encoded information as the bit stream output 109 (step S7a).

As in the case of an I frame, the decoder generates the video output 110 for monitoring the encoded data (step S8a).

In the next and later generation of a P frame, data of the reconfigured image of a P frame is read out instead of that of an I frame.

Next, an encoding process of a B frame will be described. Motion search is carried out for a B frame as in a P frame to configure a new image based on a motion vector obtained by the motion search, and thereafter, encoding is performed. Thus, the flow of the chart in FIG. 3 is the same as that in a P frame.

In the case of a B frame, however, the motion search is performed based not only on past image data but also on future image data, resulting in an increase in the processing amount of motion search in steps S3a and S4a. (However, the motion search is carried out based on future image data alone with respect to a B frame in an early stage of encoding where past image data does not exist.)

Figure 6:
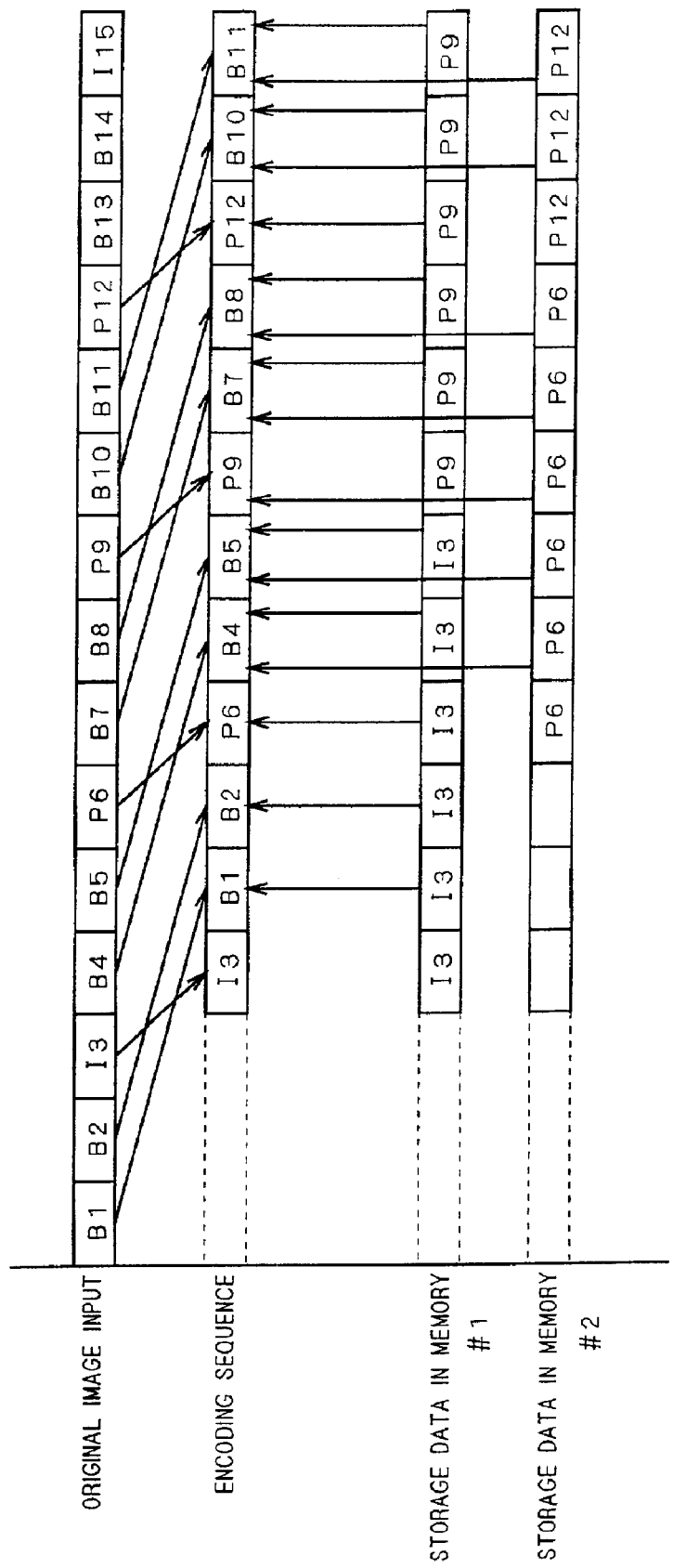
FIG. 6 is a timing chart showing the encoding sequence of I, P and B frames and storage of image data to be used for estimation into a memory in the image encoding device of the first embodiment.

Referring now to the timing chart of FIG. 6, the encoding sequence of I, P and B frames and storage of image data to be used for estimation into a memory will be described. In FIG. 6, types of frames are indicated by I, P and B, and numbers following them show the sequence of the frames.

As shown in the chart of the encoding sequence, the frames are reordered in the sequence and encoding is started from the I frame. Here, a frame I3 as the third frame is encoded first. Then, data of a reconfigured image of the frame I3 is stored as storage data #1 in the memory (#1 corresponds to that in FIGS. 4 and 5).

Next, using the data of the reconfigured image of the I3 frame, a frame B1 as the first frame is encoded. Since any frame that is to be past information has not been obtained by that time, the frame B1 is encoded using the frame I3 alone as future frame information.

Subsequently, a frame B2 as the second frame is similarly encoded using the data of the reconfigured image of the I3 frame.

Next, using the data of the reconfigured image of the I3 frame, a frame P6 as the sixth frame is encoded. Then, data of a reconfigured image of the frame P6 is stored as storage data #2 in the memory (#2 corresponds to that in FIGS. 4 and 5).

Next, using the data of the reconfigured images of the frames I3 and P6, a frame B4 as the fourth frame is encoded. At this time, encoding is performed using the frame I3 as past frame information and the frame P6 as future frame information.

Subsequently, a flame B5 as the fifth frame is similarly encoded using the data of the reconfigured images of the frames I3 and P6.

Next, using the data of the reconfigured image of the frame P6, a frame P9 as the ninth frame is encoded. Then, data of a reconfigured image of the frame P9 is stored as the storage data #1 in the memory.

Next, using the data of the reconfigured images of the frames P6 and P9, a frame B7 as the seventh frame is encoded. At this time, encoding is performed using the frame P6 as past frame information and the frame P9 as future frame information.

Subsequently, a flame B8 as the eighth frame is similarly encoded using the data of the reconfigured images of the frames P6 and P9.

The above operations are repeated in the same way to perform encoding.

According to the image data encoding device of the present embodiment, the image data to undergo motion search (a reconfigured image of a luminance signal in the present embodiment) is written into the internal memory 104. Thus, setting the bus wide between the internal memory 104 and the memory interface 103 allows to achieve the image data encoding device having processing capability of data transfer little limited by the use of the external memory 107 and being capable of controlling the capacity of the internal memory 104 for preventing an increase in costs. This enables to achieve the image data encoding device capable of transferring image data effectively and rapidly in motion search in which large amounts of data are transferred.

Table 1 shows an example that there are larger amounts of data transfer in motion search than in other processes, citing exemplary numerical values. The following document is cited for reference in connection with Table 1: "A single-Chip MPEG-2 422P@ML Video, Audio, and System Encoder with a 162 MHz Media-Processor Core and Dual Motion Estimation Cores", IEICE Trans. Electron., vol. E84-C. No.1, pp.108–122, January 2001.

TABLE 1

| Type of transfer | External memory (assuming 32 bit bus) | Internal memory (assuming 32 bit bus) |
| --- | --- | --- |
| ①original image data capturing | 176 (cycle/MB) | |
| ②timing filter | 176 (cycle/MB) | |
| ③reading of image to be encoded | 104 (cycle/MB) | |
| ④motion search (integer accuracy search) | | 656 (cycle/MB) |
| ⑤motion search (half-pel search) | | (included in the following transfer) |
| ⑥generation of estimation image | 176 (cycle/MB) | 384 (cycle/MB) |
| ⑦writing of reconfigured image | 104 (cycle/MB) | |
| ⑧reading of encoded data | 162 (cycle/MB) | |
| ⑨decoded image | 176 (cycle/MB) | |

In Table 1, "cycle" indicates the number of clock cycles required for data transfer, while "MB" indicates macro block. The above data shows exemplary numerical values assumed in the case of MP@ML (Main Profile at Main Level). Of course, these values increase or decrease in accordance with the setting of a range of motion estimation.

As apparent from Table 1, the amount of data transfer in the motion search (integer accuracy search and half-pel search) is larger than that in other processes. Here, the motion search of the half-pel search is included in the data transfer in generation of an estimation image as it can be performed at data transfer in generating the estimation image.

In the MPEG2 standard, the number of frames per second is 30. Thus, the number of pixels is 720×480 in the case of MP@ML, so that 45 MB×30 MB×30 frames=40500 MB are processed in 16×16 macro blocks for a second.

Here, the total amount of data transfer is 1074 cycle/MB (total amount of data transfer by the external memory)+1040 cycle/MB (total amount of data transfer by the internal memory)=2114 cycle/MB multiplied by 40500 MB, that is, 85.6 megacycle.

If all image data in the encoding process is mapped in the external memory, all data transfer has to be carried out through a single port, resulting in bottlenecks. In other words, since at least 85.6 megacycles are necessary as data transfer cycle, a high speed external memory operated at around 100 MHz becomes necessary, considering the overhead in transfer control as well.

The separate provision of the internal memory and the external memory as in the present embodiment results in 1074 cycle/MB×40500 MB=43.5 megacycles for the external memory and 1040 cycle/MB×40500 MB=42.1 megacycles for the internal memory. Thus, in this case, a medium or low speed external memory can be used as the external memory. Further, the bus between the internal memory and the memory interface can easily be increased in width, so that motion search and generation of an estimation image using the internal memory do not cause bottlenecks in data transfer by the external memory. This allows motion search to be carried out with high accuracy, for example, allowing motion search in a wider range.

<Second Preferred Embodiment>

The present embodiment is a modification of the image data encoding device of the first embodiment, in which image data of a color-difference signal is further added to image data used as a reference image in motion search.

Figure 7:
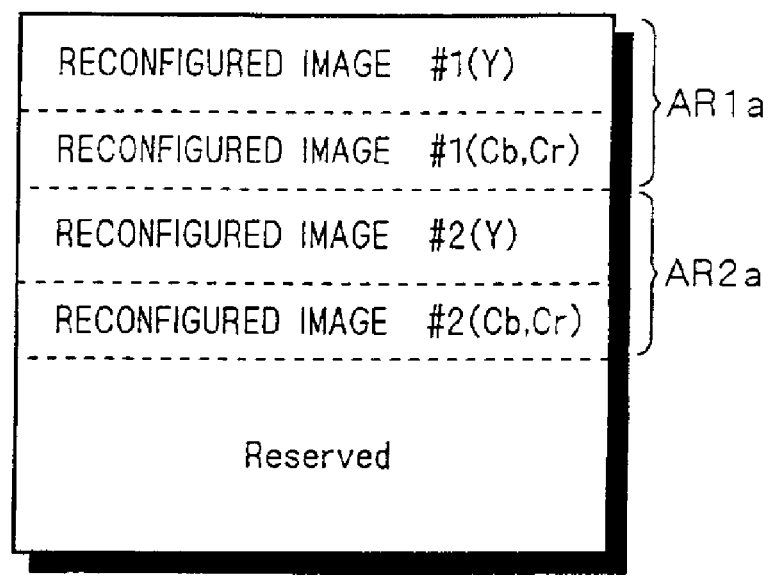
FIG. 7 shows an exemplary memory map of the internal memory 104 in the image encoding device of a second preferred embodiment of the invention.

In the present embodiment, image data of a color (Cb, Cr) signal of a reconfigured image is also stored in the area indicated as "Reserved" in the internal memory 104 as shown in FIG. 7. More specifically, when generating reconfigured images of I and P frames, image data of the luminance signal and color-difference signal of the reconfigured images is stored in the internal memory 104 for use in motion search at the next frame.

As described above, if image data used as a reference image in motion search includes image data of a color-difference signal, the motion search can be performed with higher accuracy.

Since the other structures and data transfer are the same as in the image data encoding device of the first embodiment, a repeated explanation is omitted.

<Third Preferred Embodiment>

The present embodiment is another modification of the image data encoding device of the first embodiment, in which sub-sampled image data is used for the motion search with integer pixel accuracy, and full-sampled image data is used for the motion search with half-pel accuracy.

Sub-sampling is a method of thinning out pixels by sampling every other pixel, for example. Although image data is lowered in accuracy, this method allows to reduce the capacity of image data and to reduce operating time.

FIG. 8 is a flow chart showing data transfer in an encoding process at each frame of the image encoding device according to the present embodiment. Steps S1b through S8b are almost the same as steps S1a through S8a shown in FIG. 3, except a difference that image data read out for the motion search with half-pel accuracy in step S4b is positioned in the external memory, not in the internal memory.

When generating reconfigured images of I and P frames in the present embodiment, image data is stored in the internal memory 104 in the condition that pixels have been thinned out by sub-sampling. Assuming that the sub-sampling rates are ½, ¼, ⅛, for example, capacities of the internal memory 104 required for storing the reconfigured images will be ½, ¼ and ⅛, respectively.

Figure 9:
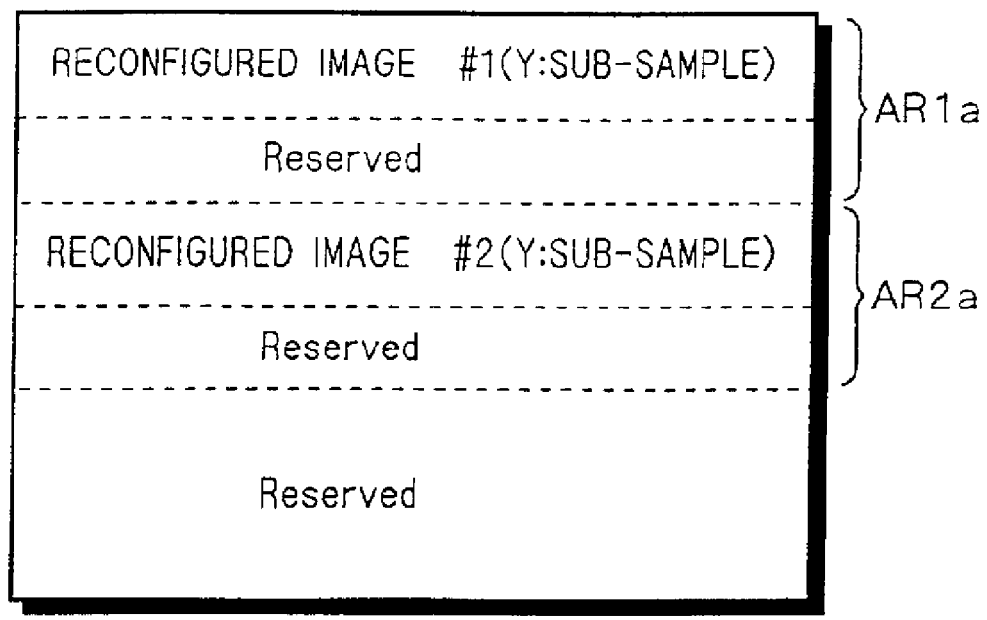
FIG. 9 shows an exemplary memory map of the internal memory 104 in the image encoding device of the third embodiment.

FIG. 9 shows an exemplary memory map of a reconfigured image in the internal memory 104 according to the present embodiment. As shown in FIG. 9, image data of a luminance (Y) signal of a sub-sampled reconfigured image is stored in the internal memory 104.

The image data is used as a reference image when performing the motion search with integer pixel accuracy in step S3b. On the other hand, in the motion search with half-pel accuracy in step S4b, the full-sampled image data is read out from the external memory 107 and used as a reference image.

In the present embodiment, the sub-sampled image data is used as a reference image in the motion search with integer pixel accuracy, which allows a reduction in capacity of the internal memory compared to the case of performing motion search for the full-sampled image data and allows a reduction in processing time required for operation.

In the motion search with half-pel accuracy, the full-sampled image data is used as a reference image. Therefore, an idea of a motion vector can be gained for a short operating time in the motion search with integer pixel accuracy, and the motion vector can be obtained accurately in the motion search with half-pel accuracy.

Since the other structures and data transfer are the same as in the image data encoding device of the first embodiment, a repeated explanation is omitted.

<Fourth Preferred Embodiment>

The present embodiment is a combination of the second and third embodiments. That is, image data of a color-difference signal is also added to image data to undergo motion search, and sub-sampled data is also used for the image data of the color-difference signal.

Figure 10:
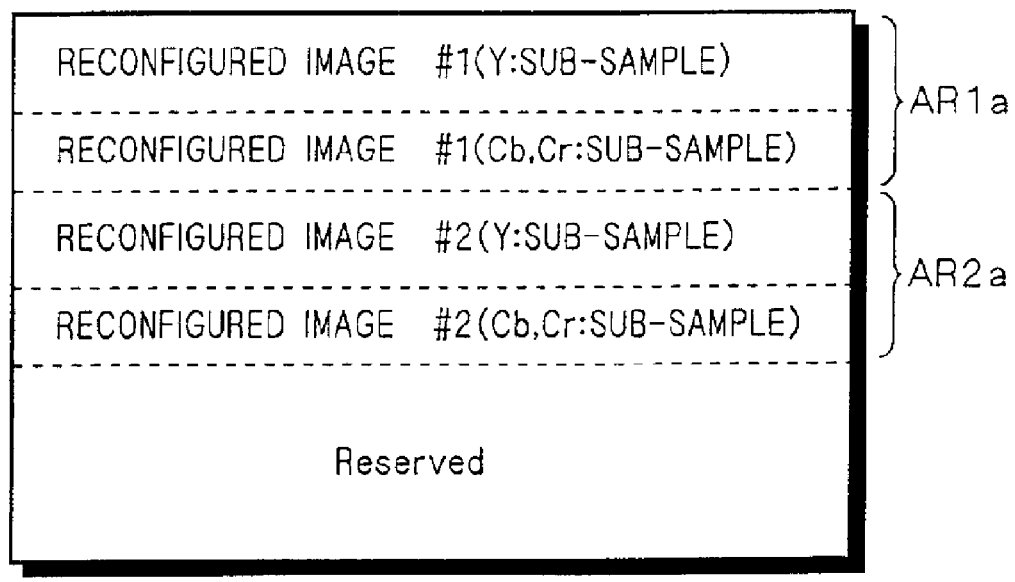
FIG. 10 shows an exemplary memory map of the internal memory 104 in the image encoding device of a fourth preferred embodiment of the invention.

Namely, in the present embodiment, image data of a color-difference (Cb, Cr) signal of a reconfigured image is stored in a sub-sampled state in the area indicated as "Reserved" in the internal memory 104, as shown in FIG. 10. More specifically, when generating reconfigured images of I and P frames, image data of the luminance signal and color-difference signal of the reconfigured images which has undergone sub-sampling is stored in the internal memory 104 for use as a reference image in motion search at the next frame.

As has been described, if image data to undergo motion search includes image data of the color-difference signal, the motion search can be performed with higher accuracy. If the image data has been sub-sampled, the internal memory can be reduced in capacity compared to the case of performing motion search for a full-sampled image data, and processing time required for operation can be reduced.

With a full-sampled image data used in the motion search with half-pel accuracy, a guess can be made at a motion vector for a short operating time in the motion search with integer pixel accuracy, and the motion vector can be obtained accurately in the motion search with half-pel accuracy.

<Fifth Preferred Embodiment>

The present embodiment is still another modification of the image data encoding device according to the first embodiment, in which image data of an inputted original image, not a reconfigured image, is used as a reference image in motion search.

FIG. 11 is a flow chart showing data transfer in the present embodiment. First, original image data is inputted into the MPEG2 processing unit 102 as the video input 108, where the data undergoes the space filtering and time filtering in the encoder as the preceding processes.

The original image data already undergone the preceding processes is stored in the external memory 107 by each frame and also in the internal memory 104 by each frame (step S1c). For instance, one frame is preferably stored alternately in the external memory 107 and the internal memory 104. Stored in the internal memory 104 is image data of a luminance signal of an original image.

After image data is stored in the external memory 107 for several frames, the data in the frames being images to be encoded is reordered in the sequence for subsequent motion search, and thereafter, is read out into the encoder in the MPEG2 processing unit 102 (step S2c).

The encoder first performs an encoding process of an I frame, and encoded information is outputted as the bit stream output 109 (step S7c). In the case of an I frame, intra-frame encoding is performed, so that motion search is not carried out.

In the decoder in the MPEG2 processing unit 102, the video output 110 is generated for monitoring the encoded data (step S8c). Further, decoded image data is stored in the external memory 107 as a reconfigured image and is used for estimating a frame and the subsequent one.

In the present embodiment, image data of a luminance signal of an original image is used as a reference image for motion search.

An encoding process requires image data of a luminance signal and that of a color-difference signal of a reconfigured image of an I frame, so that image data of the both signals is stored in the external memory 107.

FIG. 12 shows an exemplary memory map of image data of the luminance (Y) signal in the internal memory 104.

As shown in FIG. 12, stored in the storage area AR1a is only the image data #1 (Y) of the luminance signal of the original image, and there is indicated "Reserved" for image data of the color-difference signal. Similarly, stored in the storage area AR2a is only image data #2 (Y) of the luminance signal of the original image, and there is indicated "Reserved" for the image data of the color-difference signal.

Areas other than the storage areas AR1a and AR2a in the internal memory 104 are indicated as "Reserved".

The encoding process of P and B frames is the same as that in the image data encoding device of the first embodiment except that the image data of the original image is used as the reference image in the motion search instead of that of the reconfigured image and either the original image or the reconfigured image is used as the template image.

Since the other structures and data transfer are the same as in the image data encoding device of the first embodiment, a repeated explanation is omitted.

As described above, motion search may be carried out using the image data of the original image instead of that of the reconfigured image.

<Sixth Preferred Embodiment>

The present embodiment is a modification of the image data encoding device according to the fifth embodiment, in which the image data used as the reference image in motion search further includes the image data of the color-difference signal of the original image.

In the present embodiment, the image data of the color-difference (Cb, Cr) signal of the original image is also stored in the area indicated as "Reserved" in the internal memory 104 as shown in FIG. 13. More specifically, the image data of the luminance signal and that of the color-difference signal of the original image is stored in the internal memory 104 for use as the reference image in motion search at the next frame.

As described above, if image data to undergo motion search further includes the image data of the color-difference signal, the motion search can be performed with higher accuracy.

Since the other structures and data transfer are the same as in the image data encoding device of the fifth embodiment, a repeated explanation is omitted.

<Seventh Preferred Embodiment>

The present embodiment is another modification of the image data encoding device according to the fifth embodiment, in which sub-sampled image data is used as the image data of the original image used as the reference image in the motion search with integer pixel accuracy, and full-sampled image data is used as the image data of the original image used as the reference image in the motion search with half-pel accuracy.

Figure 14:
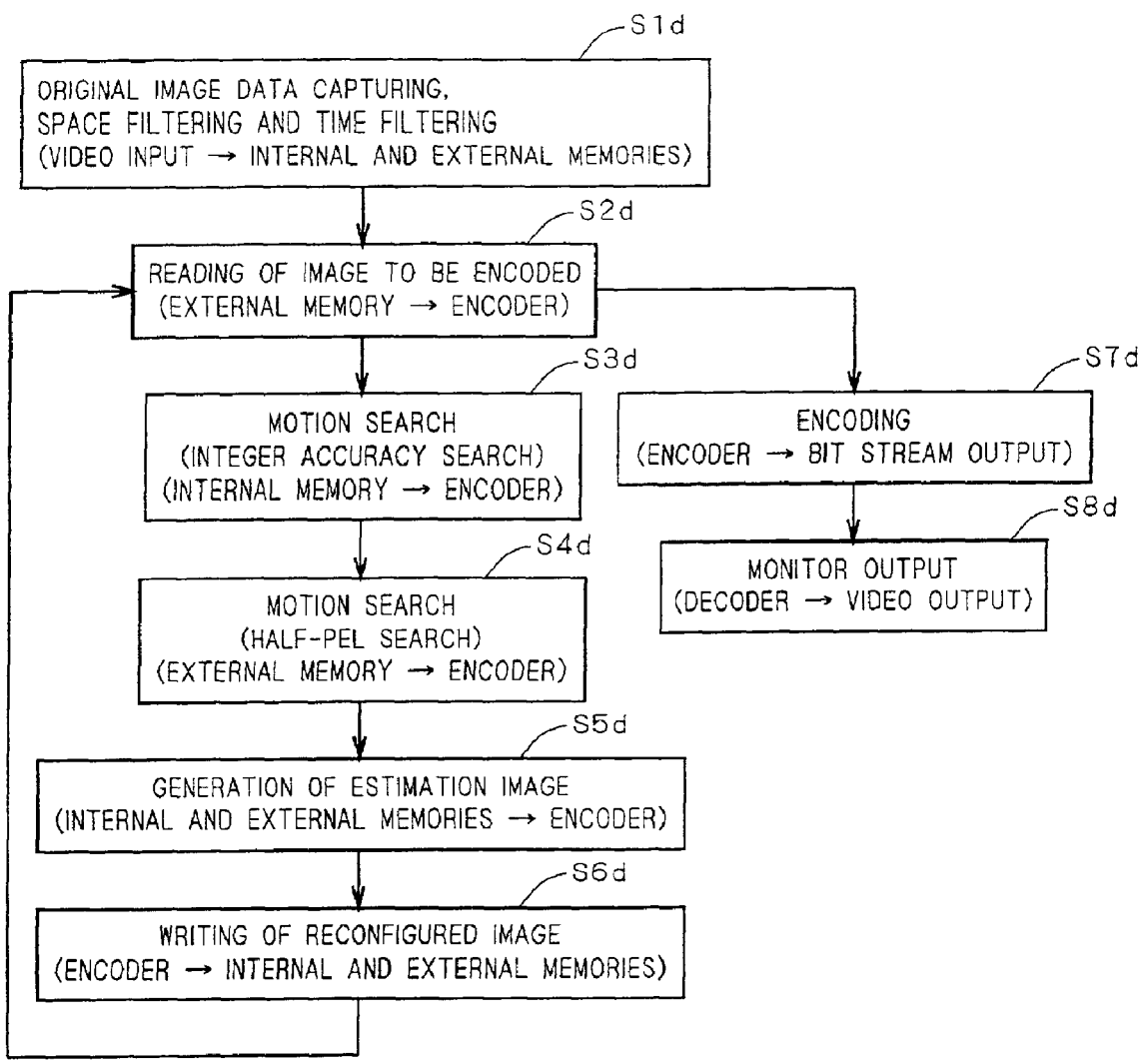
FIG. 14 is a flow chart showing data transfer in an encoding process at each frame of the image encoding device of a seventh preferred embodiment of the invention.

FIG. 14 is a flow chart showing data transfer in an encoding process at each frame of the image encoding device according to the present embodiment. Steps S1d through S8d are almost the same as steps S1c through S8c shown in FIG. 11, except a difference that image data read out for the motion search with half-pel accuracy in step S4d is positioned in the external memory, not in the internal memory.

In the present embodiment, the image data of the original image is stored in the internal memory 104 in the condition that pixels have been thinned out by sub-sampling. Assuming that the sub-sampling rates are ½, ¼, ⅛, for example, capacities of the internal memory 104 required for storing the original image will be ½, ¼ and ⅛, respectively.

Figure 15:
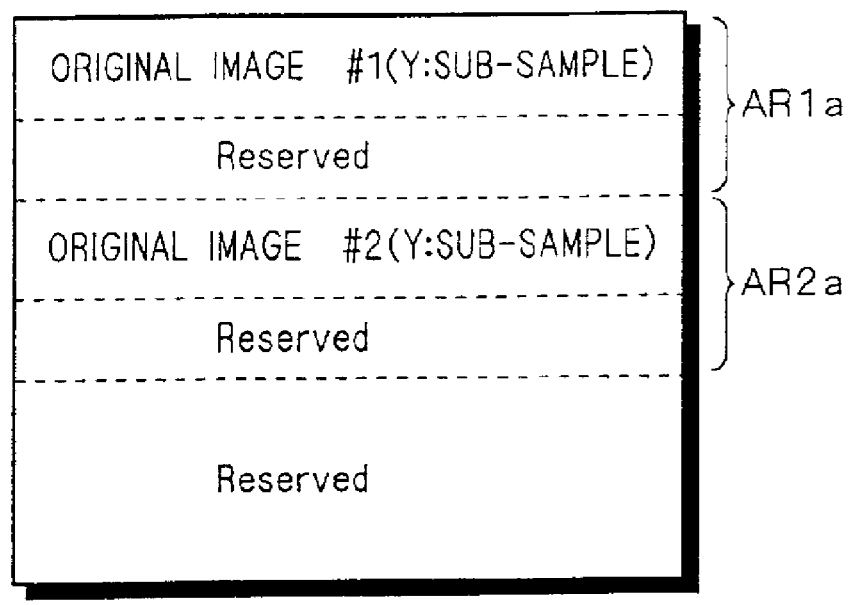
FIG. 15 shows an exemplary memory map of the internal memory 104 in the image encoding device of the seventh embodiment.

FIG. 15 shows an exemplary memory map of the original image in the internal memory 104 according to the present embodiment. As shown in FIG. 15, the image data of the luminance (Y) signal of the sub-sampled original image is stored in the internal memory 104.

The image data is then used as the reference image when performing the motion search with integer pixel accuracy in step S3d. On the other hand, in the motion search with half-pel accuracy in step S4d, the full-sampled image data is read out from the external memory 107 and used as the reference image.

In the present embodiment, the sub-sampled image data is used as the reference image in the motion search with integer pixel accuracy, which allows a reduction in capacity of the internal memory compared to the case of performing motion search for the full-sampled image data and allows a reduction in processing time required for operation.

In the motion search with half-pel accuracy, the full-sampled image data is used as the reference image. Therefore, an idea of a motion vector can be gained for a short operating time in the motion search with integer pixel accuracy, and the motion vector can be obtained accurately in the motion search with half-pel accuracy.

Since the other structures and data transfer are the same as in the image data encoding device of the fifth embodiment, a repeated explanation is omitted.

<Eighth Preferred Embodiment>

The present embodiment is a combination of the sixth and seventh embodiments. That is, the image data of the original image used as the reference image in the motion search further includes the image data of the color-difference signal, and the sub-sampled data is also used for the image data of the color-difference signal.

Figure 16:
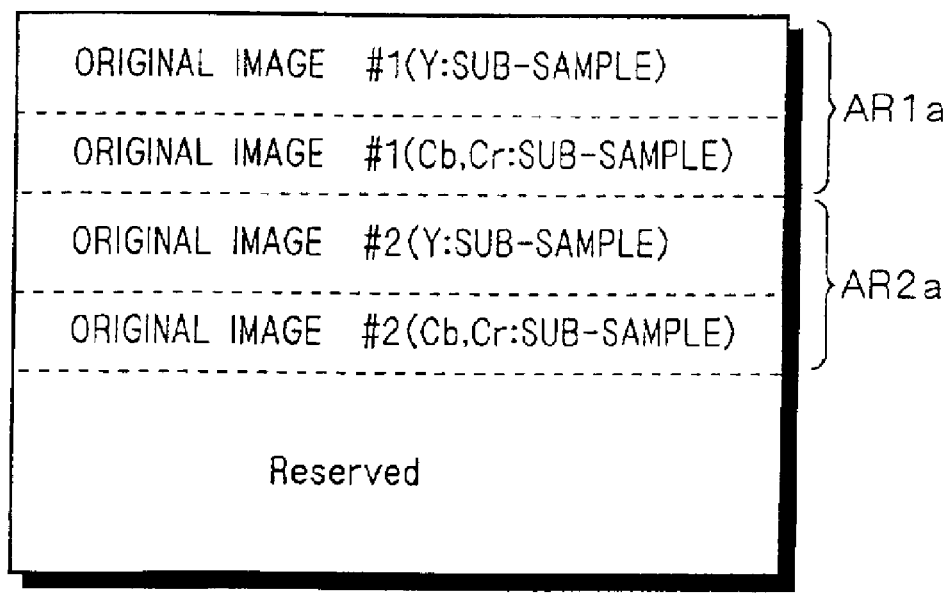
FIG. 16 shows an exemplary memory map of the internal memory 104 in the image encoding device of an eighth preferred embodiment of the invention.

Namely, in the present embodiment, the image data of the color-difference (Cb, Cr) signal of the original image is stored in a sub-sampled state in the area indicated as "Reserved" in the internal memory 104, as shown in FIG. 16. More specifically, when storing the original image, the image data of the luminance signal and that of the color-difference signal of the original image which has undergone sub-sampling is stored in the internal memory 104 for use in motion search at the next frame.

As has been described, if image data to undergo motion search includes the image data of the color-difference signal, the motion search can be performed with higher accuracy, and if the image data has been sub-sampled, the internal memory can be reduced in capacity compared to the case of performing motion search for the full-sampled image data, and processing time required for operation can be reduced.

If the full-sampled image data is used in the motion search with half-pel accuracy as in the seventh embodiment, an idea of a motion vector can be gained for a short operating time in the motion search with integer pixel accuracy, and the motion vector can be obtained accurately in the motion search with half-pel accuracy.

<Ninth Preferred Embodiment>

The present embodiment is a modification of the image data encoding device according to the sixth embodiment, in which the image data used as the reference image in the motion search further includes the image data of the color-difference signal of the original image, and further, the internal memory has a larger capacity than in the sixth embodiment so that the image data of the original image is written into the internal memory through the memory interface.

Figure 17:
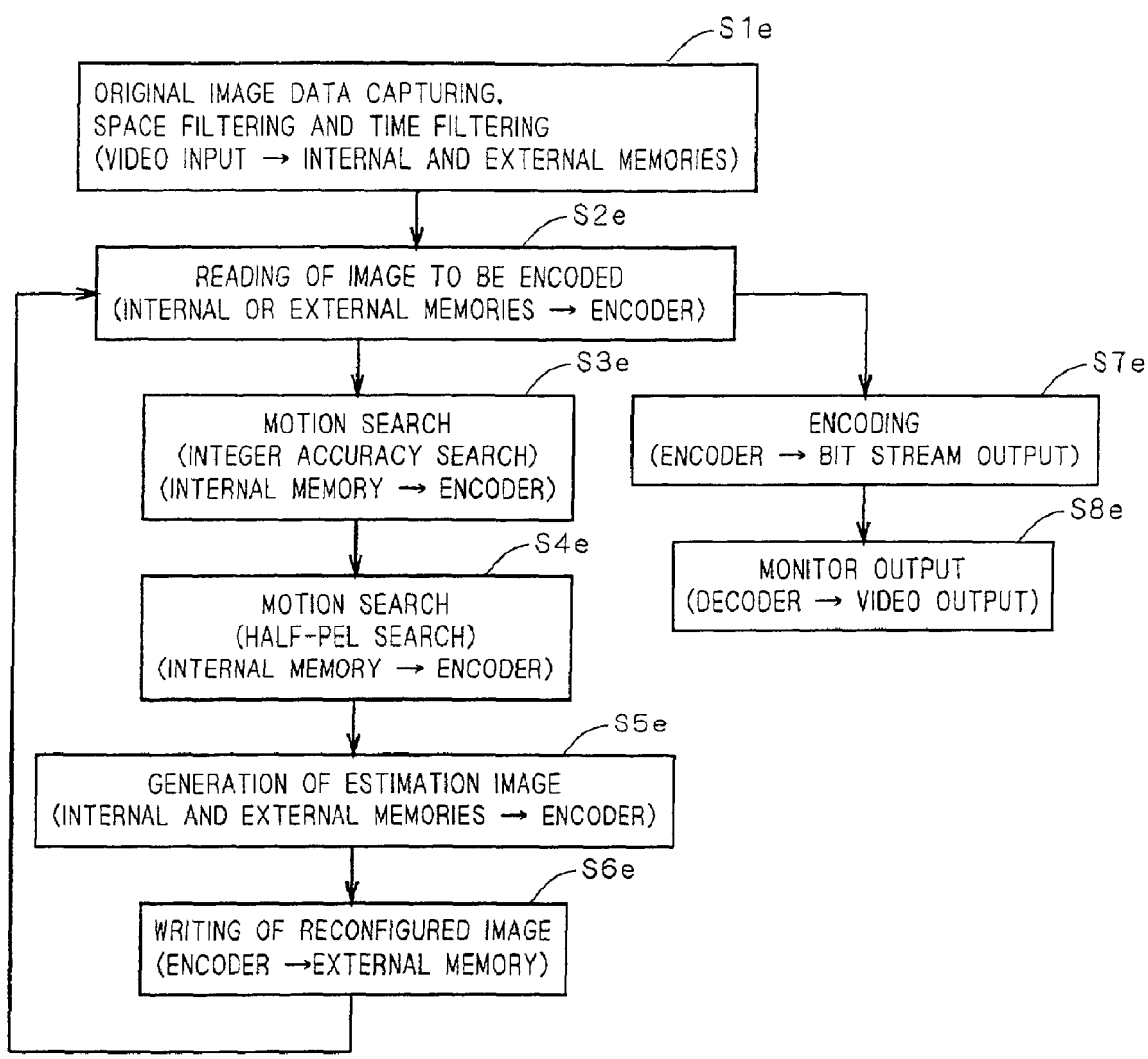
FIG. 17 is a flow chart showing data transfer in an encoding process at each frame of the image encoding device of a ninth preferred embodiment of the invention.

FIG. 17 is a flow chart showing data transfer according to the present embodiment. First, the original image data is inputted into the MPEG2 processing unit 102 as the video input 108, where the data undergoes the space filtering and time filtering in the encoder as the preceding processes.

The original image data already undergone the preceding processes is stored by each frame in the internal memory 104, not in the external memory 107. The internal memory has a larger capacity than in the sixth embodiment to such an extent that plural pieces of original image data can be stored. Stored in the internal memory 104 is the image data of the luminance signal and that of the color-difference signal of the original image.

After image data is stored for several frames, the data in the frames being images to be encoded is reordered in the sequence for subsequent motion search, and thereafter, is read out into the encoder in the MPEG2 processing unit 102 (step S2e).

The encoder performs an encoding process of an I frame, and encoded information is outputted as the bit stream output 109 (step S7e). In the case of an I frame, intra-frame encoding is performed, so that motion search is not carried out.

In the decoder in the MPEG2 processing unit 102, the video output 110 is generated for monitoring the encoded data (step S8e). Further, decoded image data is stored in the external memory 107 as the reconfigured image and are used for estimating a frame and the subsequent one.

In the present embodiment, the image data of the luminance signal and that of the color-difference signal of the original image is used for the reference image in motion search.

The encoding process requires image data of the luminance signal and that of the color-difference signal of the reconfigured image of an I frame, so that image data of the both signals is stored in the external memory 107.

Figure 18:
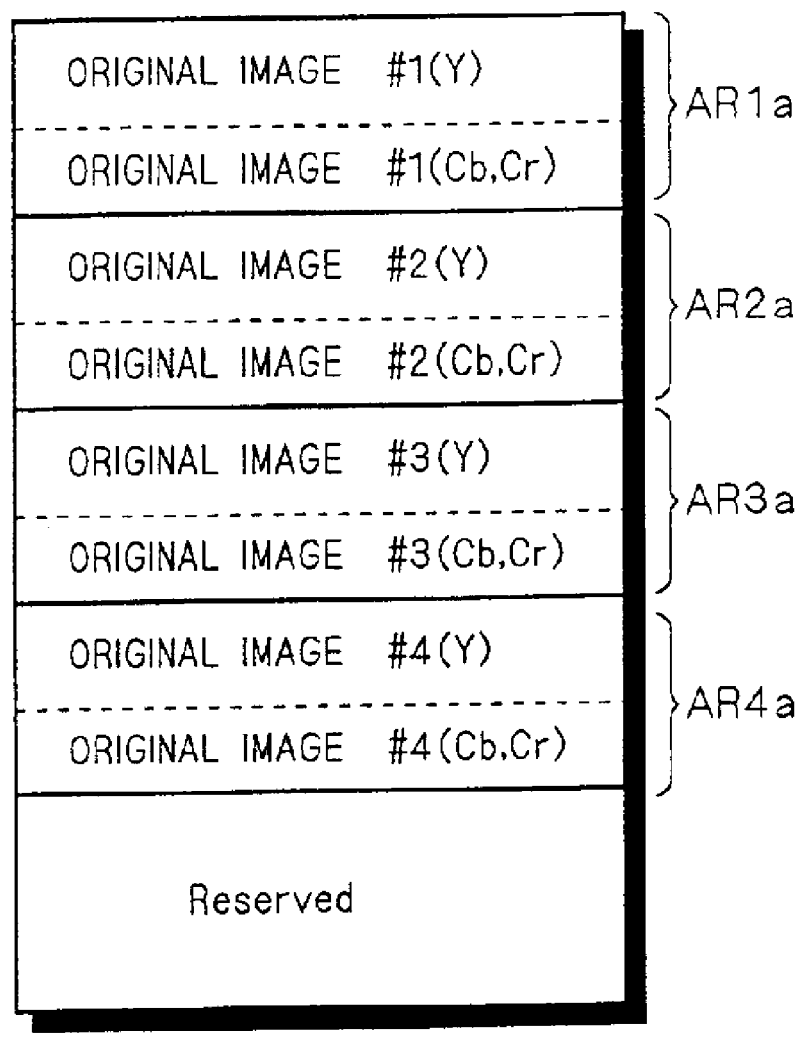
FIG. 18 shows an exemplary memory map of the internal memory 104 in the image encoding device of the ninth embodiment.
Figure 19:
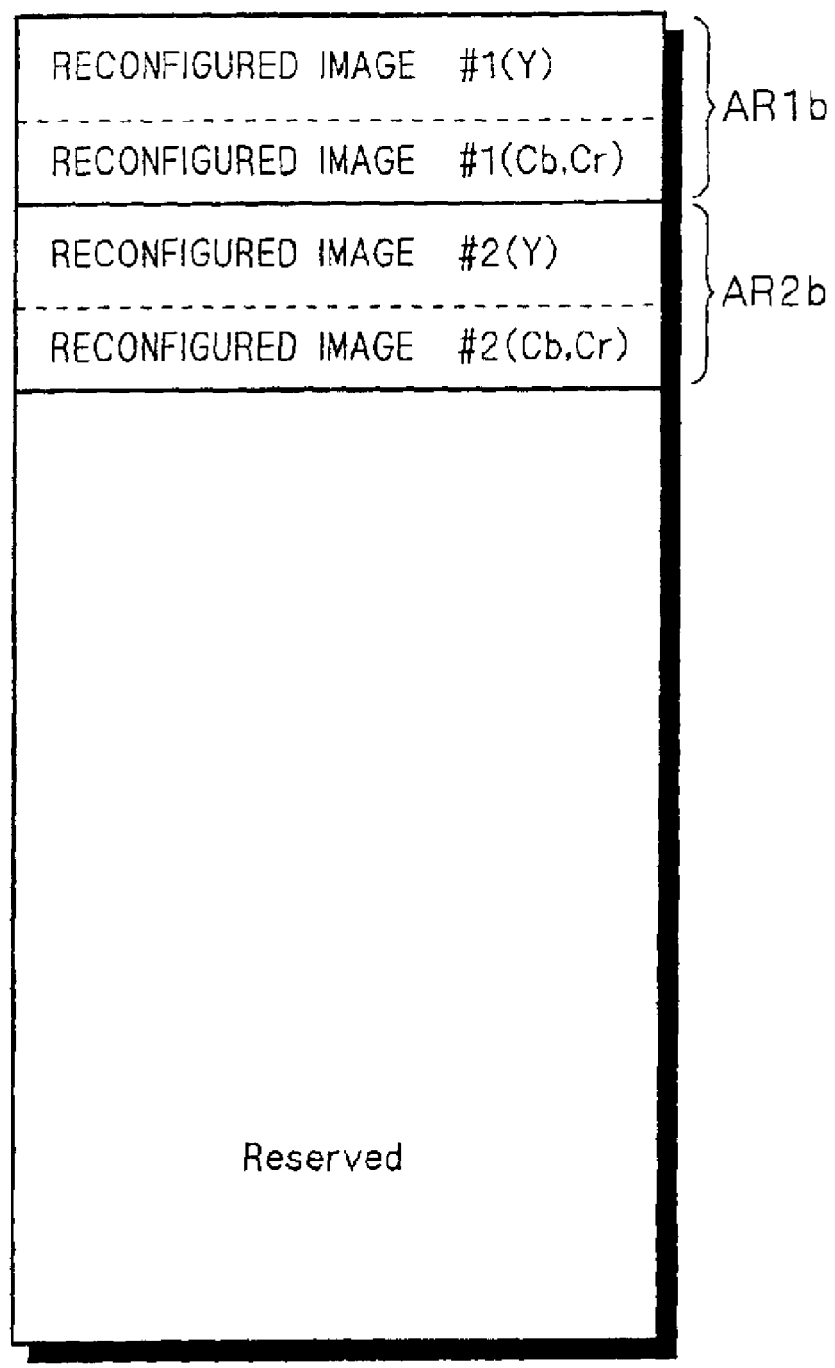
FIG. 19 shows an exemplary memory map of the external memory 107 in the image encoding device of the ninth embodiment.
Figure 2:
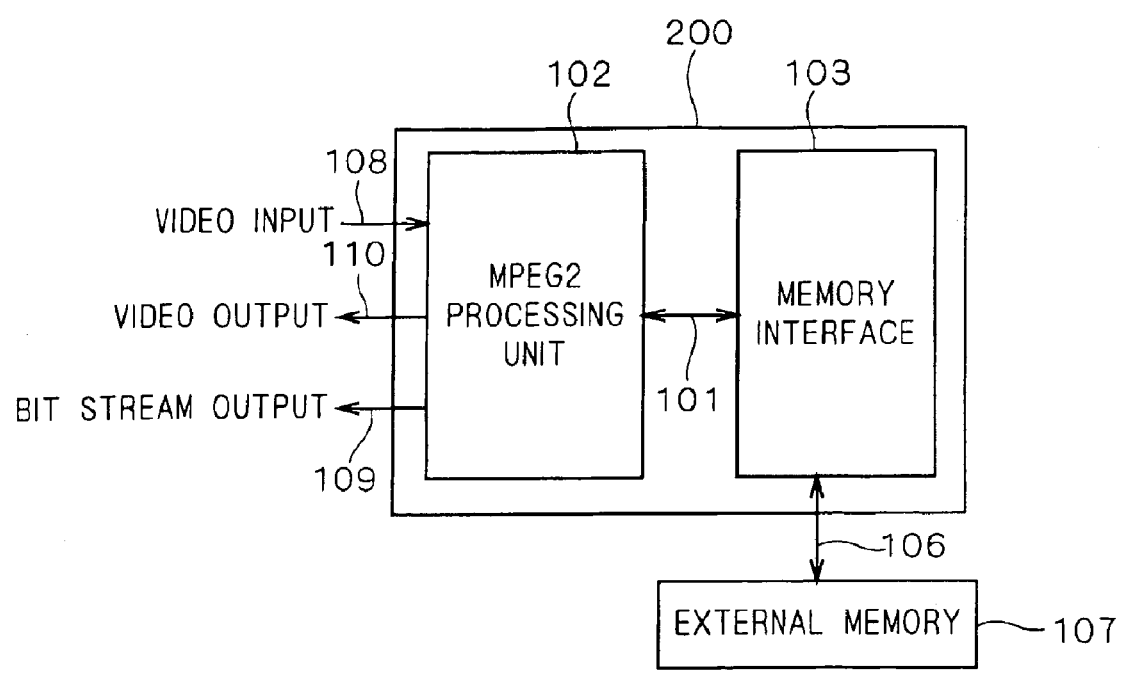
Figure 21:
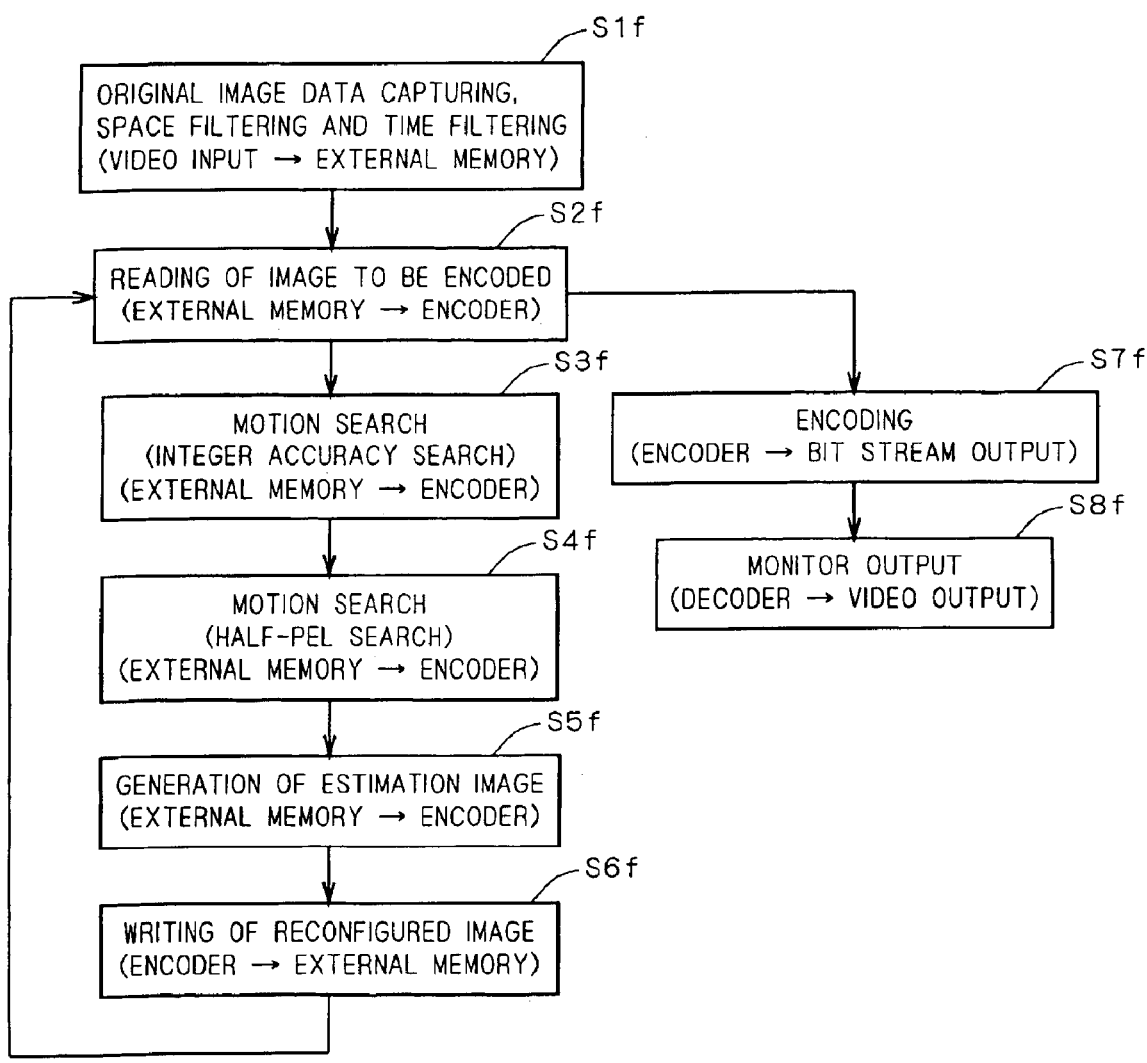
FIG. 21 is a flow chart showing data transfer in an encoding process at each frame of the conventional image encoding device.

FIGS. 18 and 19 show exemplary memory maps of the image data of the luminance (Y) signal and that of the color-difference (Cb, Cr) signal. FIG. 18 is an exemplary memory map of the internal memory 104, and FIG. 19 is an exemplary memory map of the external memory 107.

As shown in FIG. 18, stored in the storage area AR1a is image data #1 (Y) on the luminance signal and image data #1 (Cb, Cr) of the color-difference signal of the original image. Similarly, stored in the storage areas AR2a through AR4a is image data #2 (Y) through #4 (Y) of the luminance signal and image data #2 (Cb, Cr) through #4(Cb, Cr) of the color-difference signal of the original image.

On the other hand, as shown in FIG. 19, stored in the storage area AR1b is image data #1 (Y) of the luminance signal and image data #1 (Cb, Cr) of the color-difference signal of the reconfigured image. Similarly, stored in the storage area AR2b is image data #2 (Y) through #4 (Y) of the luminance signal and image data #2 (Cb, Cr) through #4 (Cb, Cr) of the color-difference signal of the reconfigured image.

Areas other than the storage areas AR1a and AR4a of the internal memory 104 are indicated as "Reserved", and areas other than the storage areas AR1b and AR2b are indicated as "Reserved".

The encoding process of P and B frames is the same as that in the image data encoding device of the sixth embodiment except that the image data of the original image is used as the reference image in the motion search instead of that of the reconfigured image and either the original image or the reconfigured image is used as the template image.

Since the other structures and data transfer are the same as in the image data encoding device of the sixth embodiment, a repeated explanation is omitted.

As has been described, motion search may be carried out using the image data of the original image instead of that of the reconfigured image.

According to the image data encoding device of the present embodiment, inputted plural pieces of image data are written into the internal memory through the memory interface as the original image, which allows to employ an external memory that is not very excellent in specs for the operational speed and the bus width, different from the case of writing inputted image data into the external memory.

While the invention has been shown and described in detail, the foregoing description is in all aspects illustrative and not restrictive. It is therefore understood that numerous modifications and variations can be devised without departing from the scope of the invention.

What is claimed is:

1. An image data encoding device comprising:
an internal memory;
a memory interface that can be connected to an external memory, said memory interface being connected to said internal memory for controlling reading/writing of data with respect to said external memory and said internal memory; and
an image data encoding unit in which a sequence of plural pieces of image data are inputted, performing motion search for said image data to generate an estimation image and encoding said image data using said estimation image, wherein
said image data used as a reference image in said motion search is written into said internal memory through said memory interface,
said image data used as said reference image in said motion search is image data of a reconfigured image which is an estimation image previously generated and includes sub-sampled image data of said reconfigured image,
full-sampled image data is written into said external memory,
said motion search includes motion search with integer pixel accuracy an motion search with half-pel accuracy,
said sub-sampled image data is used as a reference image in said motion search with integer pixel accuracy, and said full-sampled image data is used as a reference image in said motion search with half-pel accuracy.

2. The image data encoding device according to claim 1, wherein
said image data used as said reference image in said motion search is also written into said external memory through said memory interface.

3. The image data encoding device according to claim 1, wherein
said image data used as said reference image in said motion search is image data of a reconfigured image which is an estimation image previously generated and includes image data of a luminance signal of said reconfigured image.

4. The image data encoding device according to claim 1, wherein
said image data used as said reference image in said motion search further includes image data of a color-difference signal of said reconfigured image.

5. An image data encoding device comprising:
an internal memory;
a memory interface that can be connected to an external memory, said memory interface being connected to said internal memory for controlling reading/writing of data with respect to said external memory and said internal memory; and
an image data encoding unit in which a sequence of plural pieces of image data are inputted, performing motion search for said image data to generate an estimation image and encoding said image data using said estimation image, wherein
said image data used as a reference image in said motion search is written into said internal memory through said memory interface,
said image data used as said reference image in said motion search is data of an original image of said image data inputted and includes sub-sampled image data of said original image,
full-sampled image data is written into said external memory,
said motion search includes motion search with integer pixel accuracy and motion search with half-pel accuracy,
said sub-sampled image data is used as a reference image in said motion search with integer pixel accuracy, and
said full-sampled image data is used as a reference image in said motion search with half-pel accuracy.

6. The image data encoding device according to claim 5, wherein
said image data used as said reference image in said motion search is data of an original image of said inputted image data and includes image data of a luminance signal of said original image.

7. The image data encoding device according to claim 5, wherein
said image used as said reference image in said motion search further includes image data of a color-difference signal of said original images.

8. The image data encoding device according to claim 5, wherein
said plural pieces of image data inputted are written into said internal memory through said memory interface as an original image.

* * * * *